United States Patent
Mathias et al.

(10) Patent No.: US 6,196,917 B1
(45) Date of Patent: Mar. 6, 2001

(54) GOAL DIRECTED USER INTERFACE

(75) Inventors: Keith E. Mathias, Ossining; J. David Schaffer, Wappingers Falls, both of NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/196,573

(22) Filed: Nov. 20, 1998

(51) Int. Cl.⁷ .................................................... A63F 9/24
(52) U.S. Cl. ................................... 463/2; 463/37
(58) Field of Search ............................... 463/2, 4, 7, 36, 463/37, 38; 273/317.1, 317.3, 317.5, 108.4

(56) References Cited

U.S. PATENT DOCUMENTS

| | | | |
|---|---|---|---|
| 5,624,117 | * 4/1997 | Ohkubo et al. | 463/37 |
| 5,890,906 | * 4/1999 | Macri et al. | 463/4 |
| 5,929,844 | * 7/1999 | Barnes | 463/37 |
| 6,001,015 | * 12/1999 | Nishiumi et al. | 463/38 |
| 6,068,554 | * 5/2000 | Tyler | 463/38 |

FOREIGN PATENT DOCUMENTS

| 0467720 | 1/1992 | (EP) | G06F/3/033 |
|---|---|---|---|

OTHER PUBLICATIONS

Warcraft II User's Manual, pp. 1–31, Blizzard Entertainment, 1996.*
Cavusoglu A Et Al: "Animating Multiple Figures Using A Language Interpreter" iee vol. Conf.7 1994. pp. 1219–1221 xp000506266 p. 1219 Right Hand Column, Paragraph 2.

* cited by examiner

*Primary Examiner*—Peter Vo
*Assistant Examiner*—John Paradiso
(74) *Attorney, Agent, or Firm*—Gregory L. Thorne (57) ABSTRACT

A user interface is provided that allows for the control of the movement of multiple objects by the identification of a target location associated with each of the multiple objects. The identification of the target location is via a coordinate pointer associated with an input device, and the association of the target location to a particular object is via the closure of a switch on an input device that is associated with the particular object. After identifying an associated target location, the object is moved toward the target location without further input from the user. In a preferred embodiment, the movement of the object toward the target location is dependent upon rules of motion and rules of engagement with other objects or obstacles, thereby facilitating a realistic rendering of the object's path toward the target. The rules of motion and engagement may be specific to each type of object being moved, and also subject to the interactions of multiple objects and obstacles.

18 Claims, 5 Drawing Sheets

GOAL DIRECTED USER INTERFACE

BACKGROUND OF THE INVENTION

1. Field of the Invention

This invention relates to the field of computers, and in particular to the field of computer games, simulations, and robotic control.

2. Description of Related Art

Users interact and control computer games and simulations via a variety of user interfaces. A common user interface is via a joystick with one or more buttons or triggers. The user controls the simulated movement of a game piece, such as an animated figure on a computer screen, by tilting the joystick in the direction that the user desires the game piece to move. Similarly, a user controls the simulated flight of an aircraft by tilting the joystick corresponding to the movement of controls on an actual aircraft. The joystick is also commonly used as an input device for remotely controlled equipment, such as model airplanes, factory traveling lifts, and the like. As the field of robotics continues to expand, more devices and equipment will be remotely controlled, predominantly via a computer interface between the user and the device being controlled.

Another common computer interface device is a mouse. Although a mouse is convenient for interacting with computer applications such as word processors and spreadsheets, its use as an interface device for games, simulations, and remote control is somewhat limited. Conventionally, the mouse is used to select from a menu of options to control the device. For example, the user may point to an animation of a control that is displayed on a screen, and click at differing locations on the control to effect different motions. In a game or simulation, the user may click on an animated figure and drag the figure to a new location, but such an instantaneous translation may be inconsistent with a sense of lifelike movement that most games and simulations strive to achieve. Touchpads and directional arrows on a keyboard are also commonly used, with similar interface characteristics as a mouse.

The user interface to a computer game or simulation is particularly problematic with regard to the control of figures and objects that can be moved independently. Traditionally, a single motion vector is associated with the user interface control. The user controls, for example, a simulated ping-pong paddle, and the motion of the simulated ping-pong ball is controlled directly by the motion or position of the ping-pong paddle. Similarly, a user controls the motion of a simulated aircraft, and controls the trajectory of a simulated projectile from the aircraft by appropriately orienting the simulated aircraft and then triggering the discharge of this projectile at this orientation. Some actual games or events, however, do not conform to this simulated paradigm. A football player does not necessarily pass the football in the same direction that he is traveling. A pilot can fire a guided missile in a direction that is different from the direction that the aircraft is traveling. Computer games and simulations must support the independent motion control of figures and objects if they are to convey a representation that is lifelike. In a conventional computer game or simulation, independent motion control is effected via a context switch. For example, dual controls are provided, either as two discrete joysticks, for example, or two discrete controls displayed on the computer screen. One of the joysticks or controls is used to control, for example, the motion of the football player, while the other is used to control the passing of the football. If only one joystick or control is available, the user effects the independent control via another switch that controls the interpretation of the input received via the single joystick or control. This explicit context switch, or the switch to a second control area on the screen, can be a disconcerting distraction that interferes with the intended simulation of lifelike behavior.

BRIEF SUMMARY OF THE INVENTION

It is an object of this invention to provide a user interface that is easy to use and allows for the lifelike movement of animated figures and objects. It is a further object of this invention to provide a user interface that allows for an independent control of the movement of multiple figures and objects without requiring a discrete context switch.

These objects and others are achieved by noting that, in many situations, the identification of a target objective is as significant as the direct control of the motion of an object toward that objective. That is, for example, in some games, the challenge lies in the control of a weapon to hit a target, whereas in other games, the challenge lies in the effective choice of targets. In a football scenario, one game may challenge the user's ability to maneuver a runner through a maze of blockers, whereas another game may challenge the user's ability to choose when to pass, and to whom to target with the pass. In many true life scenarios, the player consciously chooses a goal, and instincts and training effect a means of achieving the goal. That is, a forward end on a football team knows where he is to be at the culmination of each play. Most of the forward end's motion toward the given objective is the effect of relatively unconscious thought as he jogs and swerves around the opposing players. Conscious thoughts come into play if and when a situation arises that causes the player to modify the objective.

In accordance with this invention, the user controls the game or simulation by identifying the goal, or objective, of the movement of an object, rather than directly controlling that movement. The controlled object operates virtually autonomously in its motion toward the specified goal. To assure realism, the controlled object conforms to rules of motion, such as inertial effects, as well as rules of engagement with other objects, such as avoidance, collision, and the like. As the simulated play develops, the user may adjust the goal, thereby emulating the decision processes that occur during an actual play. By identifying the goal or objective, rather than the actual motion of the controlled object, the user interface is inherently more suitable for interaction via a mouse or a touch pad. For example, on a display of a football field, the user uses a mouse to point to the target location of a controlled forward end. After clicking at that location, the simulated forward end proceeds toward that location, in a substantially autonomous manner.

In accordance with another aspect of this invention, the user controls the motion of independent objects by identifying the goal of each object, independently. In the football scenario, the user controls the motion of the football by pointing to a target location for the football. When the user activates a switch, such as a mouse button or trigger, at the target location, the simulated football player that is carrying the football throws the football in the direction of the target location. The simulated football travels toward the target location, subject to rules of motion, aerodynamics, engagement, and the like. Note that the selection of the target location for the football is independent of the selection of a target location for the football carrier. Each button or switch on the input device is associated with a controlled object. For example, clicking the left button on a mouse identifies the target location of the carrier, and clicking the right button on the mouse identifies the target location of the football.

In an alternative embodiment of the invention, the goal directed user interface is used to control physical objects, such as semi-autonomous robots in a factory environment. In another embodiment, the user interacts with the physical environment, rather than with a computer screen, to identify the goals for such physical objects.

DETAILED DESCRIPTION OF THE INVENTION

Figure 1:
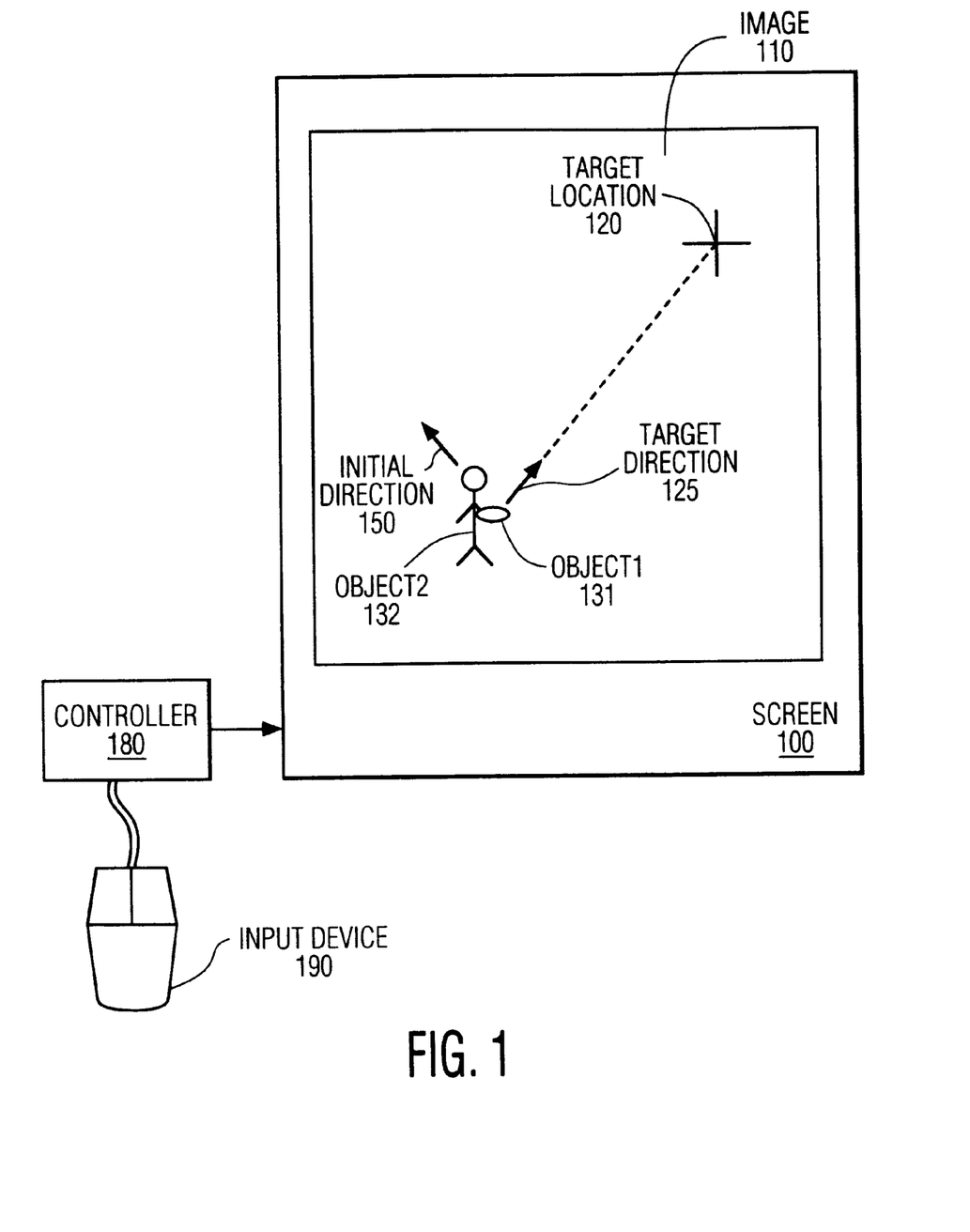
FIG. 1 illustrates an example of a user interface for controlling the movement of an object in accordance with this invention.

FIG. 1 illustrates an example of a user interface in accordance with this invention. The interface comprises an input device 190 coupled to an image 110 on a screen 100 via a controller 180. The image 1 10 represents an area within a coordinate space. Illustrated in FIG. 1 are two objects in the coordinate space, object1 131 represents a football, and object2 132 represents a carrier of the football. As is common in the art of computer simulation, the image 110 is updated corresponding to relatively constant increments of time. At each increment of time, the location of each object 131 and 132 is incrementally adjusted, corresponding to the distance that a physical element, such as an actual football player that is represented by the object 132, would move in that increment of time.

In accordance with this invention, to throw the football 131, a user (not shown) uses the input device 190 to identify a target location 120 within the coordinate space to which the football 131 is to be thrown. Based on the location of the football 131 and the target location 120, the controller 180 determines a target direction 125 for subsequent movement of the football 131. At each subsequent increment of time, the football 131 is moved along the target direction 125. If the football carrier 132 had an initial movement direction 150, the controller 180 continues to incrementally move the football carrier 132 along this initial direction 150. The football 131 will continue to move toward the target location 120, without further direct control by the user.

In a preferred embodiment, the controller 180 will apply rules of motion for the football 131 as it traverses the path to the target location 120, based on a model or series of models of how an actual football would travel. For example, the elevation of the football will follow a parabolic path, the speed of travel will continually decrease as the football travels through the air, and the speed and path of the football will change abruptly if it encounters an obstacle, such as an opposing player, or such as the ground, if its elevation decreases to zero. The rules of motion may also be dependent upon characteristics of the carrier 132. The carrier 132 may be based on a model of an actual football player, such that the initial football velocity and trajectory accuracy are based on samples of the actual football player's prior performances. Similarly, the velocity and accuracy of the trajectory may be a function of the state of the carrier 132 at the time that the football 131 is thrown. For example, the velocity and accuracy can be expected to be greater if the carrier 132 is stationary when the football 131 is thrown. Similarly, the accuracy can be expected to be poorer if the carrier 132 is surrounded by oncoming opposing players. In a preferred embodiment, the controller 180 is programmed to effect these and other such rules, as well as random factors, to facilitate a realistic simulation and rendering of the game on the screen.

Figure 2:
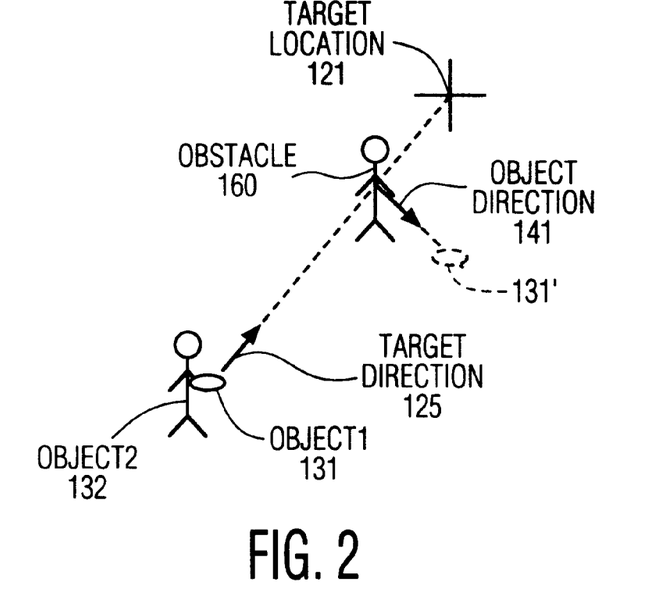
FIG. 2 illustrates an example of motion processing of a ballistic object in accordance with this invention.
Figure 3:
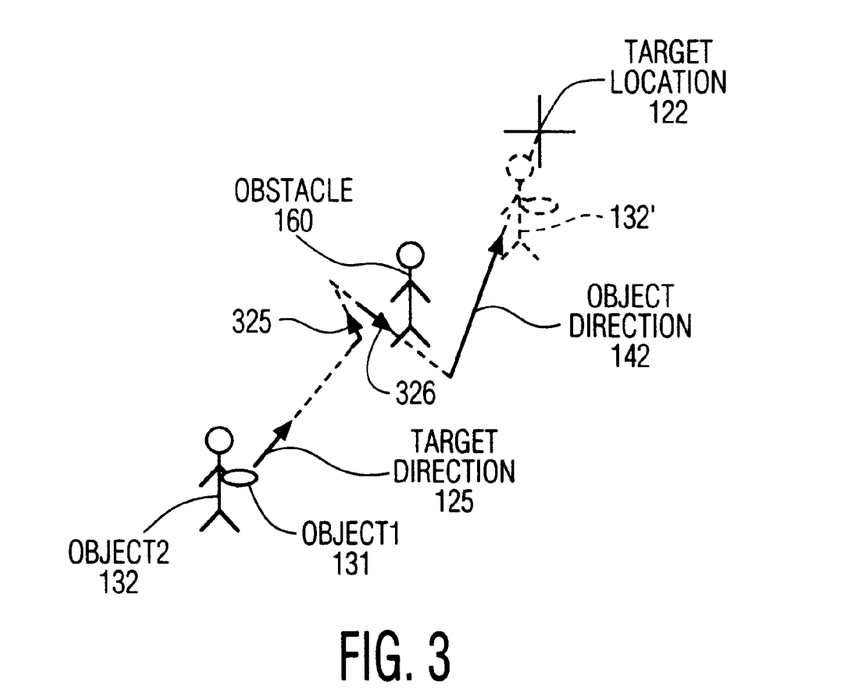
FIG. 3 illustrates an example of motion processing of a self-propelled object in accordance with this invention.

In a preferred embodiment, the rules of motion will be dependent upon the object being moved. FIG. 2 illustrates the motion processing of a ballistic object, such as a football 131, and FIG. 3 illustrate the motion processing of a self-propelled object, such as a football carrier 132. In FIG. 2, the target location 121 is the intended target location for the football 131, in FIG. 3, the target location 122 is the intended target location for the football carrier 132. That is, FIG. 2 represents a passing play, and FIG. 3 represents a running play. Illustrated in FIGS. 2 and 3 is an obstacle 160 that lies along the target direction 125 from the location of the object 131, 132 and the target location 121, 122. At each increment in time, the controller 180 moves the object 131, 132 along the target direction 125, decreasing the distance between the object 131, 132 and the obstacle 160. During these time increments, the obstacle 160, and other obstacles and players, may also be moved by the controller 180.

Referring to FIG. 2, at some point in time, the football object 131 becomes coincident with the obstacle 160, and its velocity and path will change abruptly. Illustrated in FIG. 2 is a deflection of the football 131' along a different object direction 141, caused by the collision of the football 131 with the obstacle 160. Alternatively, the controller 180 could effect an interception of the football 131 by the obstacle 160, such that the subsequent motion of the football 131 would be coincident with the subsequent motion of the obstacle 160.

Referring to FIG. 3, at some point in time, the football carrier object 132 will approach the obstacle 160. Then, under control of the rules of motion associated with the football carrier object 132, the football carrier object 132 will attempt to avoid the obstacle 160. For example, as illustrated in FIG. 3, the controller 180 may be programmed to effect a feint, wherein the carrier 132 moves slightly in one direction 325 to draw the obstacle 160 in that direction, then proceeds in an opposite direction 326 until it is clear to proceed toward the target direction again, along a new object direction 142. Note that by providing rules of motion that include actions that are common to objects of a particular type, such as the intuitive actions of a football carrier, the controller 180 can effect a realistic rendering of a game without the interruptions typically incurred by requiring the user to expressly effect such intuitive actions or automatic responses. In a preferred embodiment, the user is also provided the option of overriding the automated motion of self-propelled objects if desired.

As would be evident to one of ordinary skill in the art, the controller 180, or another controller, can effect a multi-player game by allowing different users to control different objects. For example, the obstacle 160 may be a player that is controlled by an opposing user. To simulate a one-on-one defense, the controller 180 could allow the opposing user to specify a dynamic target location, such as the dynamic location of the football carrier 132. The target location is associated with a moveable target object, such that the target location is updated each time the location of the target object changes. In this example, the obstacle 160 having a target object of the football carrier 132 would be continually moved in a direction toward the football carrier 132, even as the carrier 132 moved, thereby simulating the actions, for example, of an opposing tackle in an actual football game.

Figure 4:
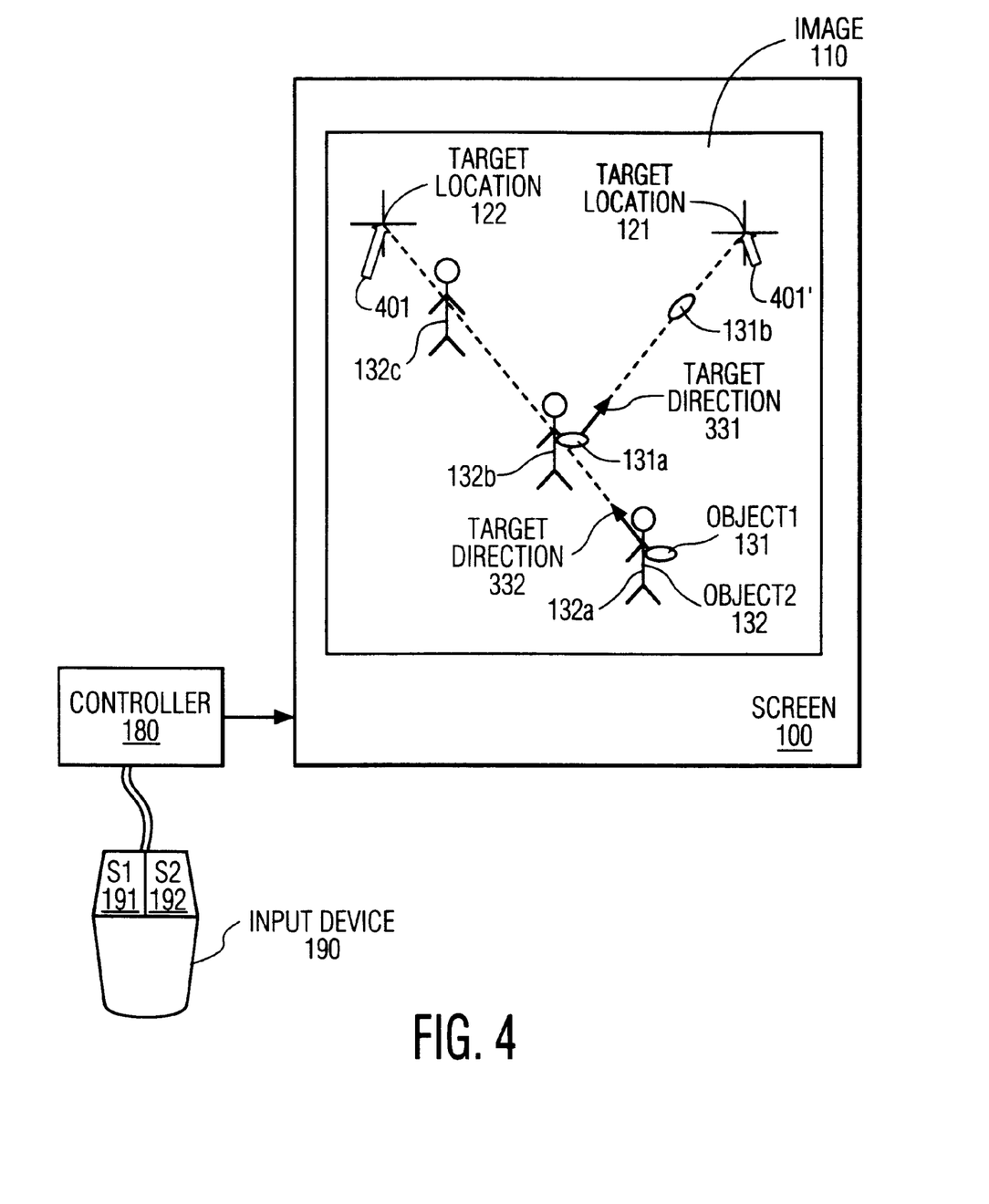
FIG. 4 illustrates the independent control of two moving objects, via the identification of two target locations, in accordance with this invention.

FIG. 4 illustrates the independent control of two moving objects 131, 132, via the identification of two target locations 121, 122. Initially, the object 132, representing a football carrier, is at location 132a. The user selects a location 122 within the image 110 coordinate space via the input device 190, and associates that target location 122 with the object 132. In a preferred embodiment, the identification of the target location 122 is via a pointer 401 that is controlled by the input device 190, such as a mouse, touchpad, joystick, etc., and the association of the target location with a specific object is via switches S1, S2 on the input device 190. Note that the image 110 on the screen 100 is provided merely as a reference plane for identifying locations in a coordinate space. As would be evident to one of ordinary skill in the art, other means of identifying a location in a coordinate space are commonly available. For example, the coordinate space may be presented on a "digital white board," and the user may identify target locations via a laser pointer coupled to the board. The user may be in a virtual reality environment, with equipment that senses the user's motions and gestures. In this environment, the user need only point to a target location to effect its identification. Combinations of such input scenarios are also well within the scope of this invention. For example, the user may be in a real environment and may use a pointer that is coupled to the controller to point to actual locations in the real environment to identify target locations. Similarly, the switches on the input device may be used to control items other than the objects being moved, such as simulated environmental conditions, or actual conditions such as lighting. In general terms, additional switches may be used to control the state of the controller 180.

In the illustration of FIG. 4, the user associates the target location 122 with the particular object 132 by closing a particular switch S2 192 on the input device 190 when the pointer 401 is at the desired target location 122. The controller 180 thereafter moves the object 132 toward the target location 122 as discussed above. Because object 131, the football, is assigned to object 132, the football carrier, until it is thrown, the football object 131 is moved coincident with the football carrier object 132.

At a later point in time, when the objects 132, 131 are at location 132b, 131a, the user selects a target location 121 for the football object 131, thereby simulating a throw of the football 131 by the carrier 132. The target location 121 is associated with the football object 131 via the user's closure of switch S1 191 when the pointer 401' is at the target location 121. Thereafter, the object 132 continues along the initial target direction 332 toward the target location 122, as illustrated by location 132c, while the object 131 travels along a target direction 331 toward target location 121, as illustrated by location 131b. As would be evident to one of ordinary skill in the art, additional objects can be controlled by additional switches, or by the association of combinations of switch closures to particular objects.

Figure 5:
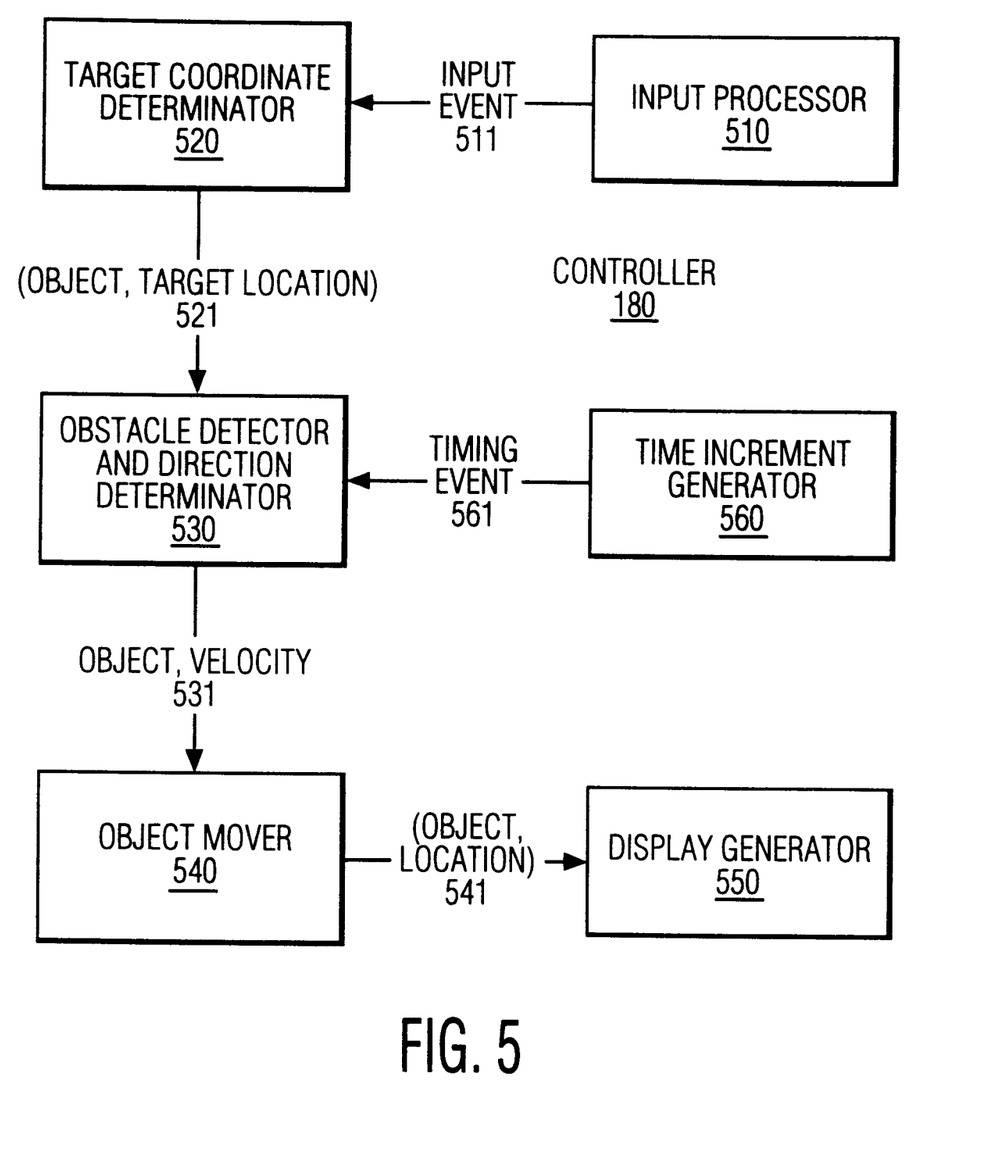
FIG. 5 illustrates an example block diagram of a controller for effecting the movement of objects accordance with this invention.

FIG. 5 illustrates an example block diagram of the controller 180. The input processor 510 receives input parameters from the input device 190. As is common in the art, the input processor 510 correlates movements of the input device to movements of a pointer on a screen so as to provide the coordinates of the pointer relative to the image coordinate space. The input processor 510 also identifies input events, including switch closures, and associates the coordinates of the pointer to the time of the input event. The input events 511 are communicated to the target coordinate determinator 520. The target coordinate determinator 520 responds to switch closure events. When a switch closure occurs, the target coordinate determinator 520 assigns a new target location, corresponding to the pointer location at the time the switch was closed, to the object that is associated with the switch that was closed. The target coordinate determinator 520 also continually identifies any modifications to other object target locations, for example for all objects that are directly controlled by the controller 180, such as opposing players in a person v. computer game, or target locations that are associated with moving target objects. The object identifier and target location 521 are communicated to the obstacle detector and direction determinator 530. Also connected to the obstacle detector and direction determinator 530 is a time increment generator 560 that generates timing events 561.

At each time increment, the obstacle detector and direction determinator 530 determines the intended direction of each object, based on the target location associated with each object and each object's current location, and determines whether there are any obstacles in the vicinity of the path between each object and its corresponding target location. Depending on the type of object, the obstacle detector and direction determinator will determine the subsequent direction that the object is to move. For example, if the object is ballistic, avoidance is impossible; the object travels along its current direction until it is coincident with the obstacle. Upon collision, the obstacle detector and direction determinator 530 determines a resultant new direction based on the aforementioned rules of motion and collision associated with the coincident objects. If the object is self propelled, the obstacle detector and direction determinator 530 applies the rules of motion and collision associated with the object to determine the appropriate changes, if any, to the object's direction of travel. For consistency, the obstacle detector and direction determinator 530 also applies any other rules that may affect an object's direction, such as the introduction of random factors, aerodynamic effects, and the like. For example, if the object is a missile that is fired from a moving vehicle, the obstacle detector and direction determinator 530 will compute a vector sum of the missile's thrust and initial velocity to determine a more realistic path for the missile as it travels toward its target location. Based on the occurrence of obstacles and the appropriate rules of motion, the obstacle detector and direction determinator 530 conveys a velocity 531 that is associated with each object to the object mover 540. The velocity 531 includes both a magnitude and direction of movement for the associated object.

The object mover 540 modifies the location 541 of each object in dependence upon the velocity 531 currently associated with each object. Each object's location 541 is conveyed to the display generator 550 that renders the image 110 for display on the screen 100. At the next time increment, the time increment generator 560 triggers a timing event 561 that causes the obstacle detector and direction determinator 530 to update each object's velocity 531. Based on the new velocities 531, the object mover 540 adjusts the object locations and a new image 110 is generated by the display generator 550.

A number of optimizations can be effected in the above processing. For example, the object mover 540 may only communicate locations 541 of objects that have moved since the last timing event, and the display generator need only update the image in the vicinity of each moved object. Similarly, the target coordinate determinator 520 need only communicate target locations 521 that have changed. A dependency structure may be defined that associates particular events to particular objects, such that only those objects that are dependent upon the particular event are processed. For example, an object's velocity may be defined to be constant until it hits an obstacle. The obstacle detector and direction determinator 530 will not recompute the object's velocity 531 until such a collision event occurs. These and other simulation optimization techniques are common to one of ordinary skill in the art.

Figure 6:
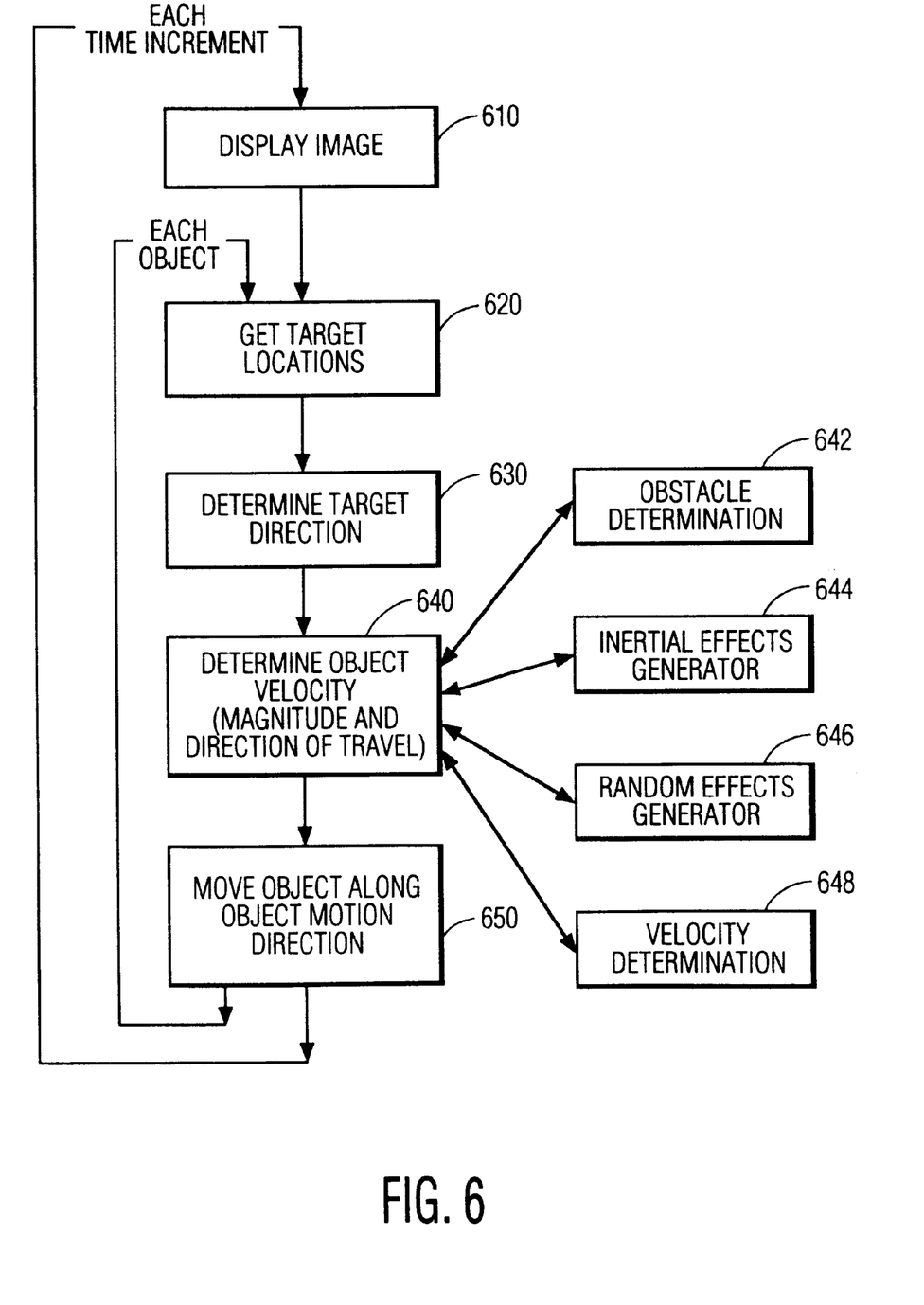
FIG. 6 illustrates an example flowchart to effect the movement of objects in accordance with this invention.

FIG. 6 illustrates an example flowchart to effect the movement of objects in accordance with this invention. At every time increment, a refreshed image is displayed, at 610, and a new image is generated corresponding to the movement of objects within the image coordinate space, via the loop 620–650. For clarity, each movable object in the image is illustrated as being processed by the loop 620–650, although the aforementioned optimization techniques may effect a bypass of one or more blocks when the output of the block is known to be unaffected.

At 620, any changes to the object's target location are determined. As previously mentioned, an object's target location may be changed by a user selection, or by an internal process. In the case of the example one-on-one defense discussed above, an object's target location may be changed each time another object's location changes. At 630, the direction from the location of the object to its target location is determined. This is the desired direction of travel for the object, but it may not be an achievable or realistic direction, due to obstacles, rules of motion, and the like. At 640, the actual direction of travel for the object is determined. As discussed above and as illustrated by example blocks 642, 644, 646, 648, the magnitude and direction of travel for the object will be dependent on a number of factors, each of the factors being determined to effect a sense of realism to the object's travel. At 650, the object is moved incrementally, based upon the velocity determination at 640. The amount of movement is determined by computing the distance that is traversed at the determined velocity during the time increment between displayed images. After all objects are moved via the loop 620–650, the new image is displayed at the next time increment, at 610, and the process 610–650 is repeated.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the invention is presented within the context of a computer game. It will be appreciated by those of ordinary skill in the art that this goal directed user interface could be applied to any number of applications relating to the movement of objects, both simulated and actual. The control of robots in a factory or office complex could be effected by pointing to the intended destination of each robot, rather than controlling the specific movements of each robot. The controller in this example would apply rules of motion and obstacle avoidance so as to effect the actual control of each robot to reach the target location. Also, the invention has been presented in the context of primarily straight line paths between the object and the target location. As would be evident to one of ordinary skill in the art, path generation algorithms, such as maze-running algorithms, can be utilized to determine the incremental velocities and movements of objects in a more complicated environment.

What is claimed is:

1. A computer interface comprising:
   an input device for selecting a target location within a coordinate space, and
   a controller, operably coupled to the input device, that effects a movement of an object in a target direction toward the target location,
   and said controller is configured for independent control of the movement of the object and at least one other object is exerted without a change in context within the computer interface.

2. The computer interface of claim 1, wherein the object has an initial movement in an initial direction that is substantially different from the target direction.

3. The computer interface of claim 1, wherein the controller comprises:
   an obstacle detector that detects obstacles between a location of the object and the target location,
   a direction determinator that determines an object direction in dependence upon the target direction and in dependence upon the obstacles between the location of the object and the target location, and
   an object mover that incrementally adjusts the location of the object in dependence upon the object direction.

4. The computer interface of claim 1, wherein:
   the input device includes a plurality of switches, at least one switch of the plurality of switches being associated with the object, and at least one other switch of the plurality of switches being associated with at least one other object, and
   the controller is further operably coupled to the plurality of switches and effects at least one other movement of the at least one other object, the at least one other movement being in an other direction toward an at least one other target location selected corresponding to a closure of the at least one other switch associated with the at least one other object.

5. The computer interface of claim 1, further including a screen that depicts an image corresponding to the coordinate space.

6. The computer interface of claim 5, wherein the controller effects the movement of the object in accordance with rules of movement associated with the object that facilitate a realistic rendering of the image on the screen.

7. The computer interface of claim 6, wherein:
   the input device includes a plurality of switches, at least one switch of the plurality of switches being associated with the object, and at least one other switch of the plurality of switches being associated with at least one other object, and
   the controller is further operably coupled to the plurality of switches and effects at least one other movement of the at least one other object, the at least one other movement being in an other direction toward an at least one other target location selected corresponding to a closure of the at least one other switch associated with the at least one other object.

8. The computer interface of claim 7, wherein
   the controller effects the movement of the at least one other object in accordance with rules of movement associated with the at least one other object that facilitates a realistic rendering of the image on the screen.

9. The computer interface of claim 1, wherein the input device further includes at least one other switch, the other switch being associated with a state of the controller.

10. The computer interface of claim 1, wherein the target location is associated with an other object having a changeable location, and the controller modifies the target location in dependence upon the changeable location of the other object.

11. A computer program stored on a computer readable medium for controlling the motion of a plurality of objects, each object of the plurality of objects having an object location within an object coordinate space, the computer program comprising:

means for identifying coordinates of a pointer within the coordinate space, means for detecting each closure of a switch of a plurality of input switches, each switch of the plurality of input switches being associated with each object of the plurality of objects without a change in context within the object coordinate space, a target coordinate determinator that determines a target location of a plurality of target locations associated with each object, in dependence upon the coordinates of the pointer when each closure is detected of the each switch associated with the each object, an object mover that incrementally adjusts each object location in an each object direction toward the each target location associated with each object.

12. The computer program of claim 11, further including:

an obstacle detector that identifies obstacles associated with each object that are located between the each object location and associated each target location, and a direction determinator that modifies each object direction in dependence upon the obstacles associated with each object.

13. The computer program of claim 11, wherein the object mover adjusts the each object location in substantial accord with rules associated with each object that simulate a movement of a physical element corresponding to the each object.

14. The computer program of claim 11, wherein the target coordinate determinator further determines at least one of the plurality of target locations in dependence upon a location of a target object in the coordinate space.

15. A method for controlling a motion of an object comprising the steps of:

defining a coordinate space, the object having an object location within the coordinate space, identifying a target location associated with the object within the coordinate space, determining a direction between the object location and the target location, incrementally modifying the object location substantially in the direction between the object location and the target location, identifying at least one other target location associated with the at least one other object, determining at least one other direction between a location of the at least one other object and the at least one other target location without a change in context within the object coordinate space, and incrementally modifying the location of the at least one other object substantially in the at least one other direction between the location of the at least one other object and the at least one other target location.

16. The method of claim 15, further including the step of determining a velocity associated with the object, and wherein the step of incrementally modifying the object location is further dependent upon the velocity associated with the object.

17. The method of claim 15, further including the step of determining obstacles associated with the object that lie between the object location and the target location, and wherein the step of incrementally modifying the object location is further dependent upon the obstacles associated with the object.

18. The method of claim 15, further including the steps of displaying an image corresponding to the coordinate space on a screen.

* * * * *